(12) United States Patent
Kimisawa et al.

(10) Patent No.: US 6,913,295 B2
(45) Date of Patent: Jul. 5, 2005

(54) FUEL TANK CONNECTOR

(75) Inventors: Toshihide Kimisawa, Yokohama (JP); Tsuyoshi Kato, Tokyo (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/370,569

(22) Filed: Feb. 24, 2003

(65) Prior Publication Data

US 2003/0178851 A1 Sep. 25, 2003

(30) Foreign Application Priority Data

Mar. 25, 2002 (JP) ........................................ 2002-083396

(51) Int. Cl.$^7$ .............................................. F16K 24/04
(52) U.S. Cl. .................... 285/423; 285/21.1; 285/21.3; 137/202; 137/587; 137/43
(58) Field of Search ............................... 285/423, 21.1, 285/21.3; 137/202, 43, 587

(56) References Cited

U.S. PATENT DOCUMENTS

| | | | |
|---|---|---|---|
| 5,139,043 A | | 8/1992 | Hyde et al. |
| 5,404,907 A | * | 4/1995 | Benjey et al. ............... 137/587 |
| 5,413,137 A | * | 5/1995 | Gimby ........................ 137/200 |
| 5,522,417 A | | 6/1996 | Tomioka et al. |
| 5,944,044 A | * | 8/1999 | King et al. .................. 137/202 |
| 5,975,116 A | * | 11/1999 | Rosas et al. ............ 137/315.11 |
| 6,058,963 A | * | 5/2000 | Enge et al. .................. 137/202 |
| 6,286,539 B1 | | 9/2001 | Nishi et al. |
| 6,308,735 B1 | * | 10/2001 | Foltz ........................... 137/587 |
| 6,382,231 B2 | * | 5/2002 | Sugizaki et al. .......... 137/15.26 |
| 6,408,867 B2 | * | 6/2002 | Aoki et al. ................... 137/202 |
| 6,470,911 B2 | * | 10/2002 | Miura et al. ................. 137/592 |
| 6,578,597 B2 | * | 6/2003 | Groom et al. ................. 137/43 |
| 6,592,100 B2 | * | 7/2003 | Chou et al. ................... 251/144 |
| 6,662,820 B2 | * | 12/2003 | Dunkle ....................... 137/202 |
| 6,679,282 B2 | * | 1/2004 | Aoki et al. ................... 137/202 |
| 6,733,048 B2 | * | 5/2004 | Kurihara et al. ............ 285/423 |
| 2001/0047822 A1 | * | 12/2001 | Aoki et al. ................... 137/202 |
| 2001/0050104 A1 | | 12/2001 | Nishi et al. |
| 2002/0157706 A1 | * | 10/2002 | Bergsma ..................... 137/202 |
| 2003/0066558 A1 | * | 4/2003 | Muto et al. .................. 137/202 |

FOREIGN PATENT DOCUMENTS

EP          0 773 128          5/1997

* cited by examiner

Primary Examiner—James M. Hewitt
(74) Attorney, Agent, or Firm—Manabu Kanesaka

(57) ABSTRACT

A connector for a fuel tank includes a flange portion, an outer connecting portion to be connected to a pipe member and an inner connecting portion to be inserted into a fuel tank through a connecting opening of the fuel tank. The inner connecting portion has an engaging portion to be engaged with an engaged portion provided to a member when the member is to be disposed in the fuel tank. The flange portion includes an outer flange member made of a synthetic resin same as that of an outer surface of the fuel tank, and an inner flange member made of a synthetic resin having a gas barrier property and a rigidity higher than that of the synthetic resin constituting the outer flange member. The inner connecting portion and the inner flange member are made of the same material.

10 Claims, 3 Drawing Sheets

FUEL TANK CONNECTOR

BACKGROUND OF THE INVENTION AND RELATED ART STATEMENT

The invention relates to a fuel tank connector for connecting a fuel tank having an outer surface made of a synthetic resin and various types of pipe.

A connector is used for connecting a fuel tank and an internal combustion engine. This type of connector includes a flange portion for closing a connecting opening provided in the fuel tank from outside the fuel tank, and an outer connecting portion to be connected to various pipes for transferring fuel gas or the like.

The fuel tank with the outer surface made of a synthetic resin has been widely used. In such a fuel tank, the connector made of the same synthetic resin can be easily fixed to the outer surface of the fuel tank by heat-fusing an outer peripheral portion of a flange contacting the outer surface of the fuel tank.

In fixing, i.e. welding to fit the connector firmly, it is necessary to form at least a portion where the connector is welded, with the same synthetic resin as that formed in the outer surface of the fuel tank.

A high-density polyethylene has been widely used to form the outer surface of the fuel tank. However, since the polyethylene has high fuel gas permeability, it is not desirable to make the whole connector with the same synthetic resin as that of the outer surface of the fuel tank.

A casing member for receiving therein, for example, a float constituting a float valve may be connected to a portion of the connector to be inserted into the fuel tank through the connecting opening provided in the fuel tank. In this case, it is possible to provide the connector with a function as the float valve. Further, the case and connector may be provided with engaging portions for engaging each other. The connector itself is a single part, and a casing member for constituting various functional members, for example, can still be connected to the connector. However, in this case, when the whole connector is made of the same synthetic resin as that of the outer surface of the fuel tank, the engaging portion between the case and connector can not be stably secured since polyethylene has relatively low rigidity and is easy to swell by the fuel.

Therefore, an object of the invention is to provide a connector, wherein the connector can be easily welded well to the fuel tank with the outer surface made of a synthetic resin.

Another object of the invention is to provide a connector as stated above, wherein a leakage of the fuel gas can be effectively prevented, and an engaging portion of components disposed in the fuel tank can be stably held.

Further objects and advantages of the invention will be apparent from the following description of the invention.

SUMMARY OF THE INVENTION

In order to attain the above objects, according to the first aspect of the invention, a connector includes the following characteristics.

(1) The connector connects a fuel tank having an outer surface made of a synthetic resin to a pipe member.
(2) The connector includes a flange portion covering a connecting opening provided in the fuel tank from the outside of the fuel tank.
(3) The connector has an outer connecting portion to be connected to the pipe member.
(4) The connector has an inner connecting portion to be inserted into the fuel tank through the connecting opening of the fuel tank.
(5) The inner connecting portion is provided with an engaging portion for engaging an engaged portion formed in a casing member to be disposed in the fuel tank, when the casing member is fit to outside or inside of the inner connecting portion.
(6) The flange portion includes an inner flange member integrated with the inner connecting portion, and an outer flange member for covering at least an outer peripheral portion of the inner flange member.
(7) The outer flange member is made of a synthetic resin same as that of the outer surface of the fuel tank, or a synthetic resin including the synthetic resin same as that of the outer surface of the fuel tank.
(8) The connector is fixed to the fuel tank by heat-fusing at least the outer peripheral portion of the outer flange member.
(9) The inner connecting portion and the inner flange member are made of a synthetic resin with a gas barrier property and a rigidity higher than those of the synthetic resin formed in the outer flange member.

According to the structure as described above, the heat-fused portion can be welded well to the outer surface of the fuel tank around the connecting opening by inserting the inner connecting portion of the connector into the connecting opening of the fuel tank from outside in a state that at least the outer flange member at the outer peripheral portion of the flange portion is heat-fused.

Alternatively, after the inner connecting portion of the connector is inserted into the connecting opening of the fuel tank from outside, at least the outer flange member at the outer peripheral portion of the flange portion is heat-fused, so that the heat-fused portion can be welded well to the outer surface of the fuel tank around the connecting opening.

Also, the inner connecting portion and the inner flange member are made of a synthetic resin with gas barrier property and a rigidity higher than that of the synthetic resin formed in the outer flange member. Thus, leakage of the fuel gas from the fuel in the fuel tank can be effectively prevented. At the same time, the engagement between the inner connecting portion and the casing member can be stably secured.

According to the second aspect of the invention, in the fuel tank connector in the first aspect, the connector can be fixed to the fuel tank by heat-fusing the outer peripheral portion of the inner flange member and the outer peripheral portion of the outer flange member to the outer surface of the fuel tank.

With the structure as described above, the outer peripheral portion of the inner flange member made of the high gas-barrier synthetic resin is integrally fixed to the outer surface of the fuel tank, so that the leakage of the fuel gas from the fuel in the fuel tank can be further effectively prevented.

According to the third aspect of the invention, in the fuel tank connector as stated in the first and second aspects, the outer flange member is formed of a polyethylene, and the inner connecting portion and the inner flange member are formed of a mixture of polyethylene and polyamide.

With the structure as described above, the outer peripheral portion of the inner flange member can be welded well to the outer surface of the fuel tank made of polyethylene. In addition, the leakage of the fuel gas can be prevented and the engagement with the casing member can be stabilized. Further, in a case that the outer flange member is molded by an injection molding with the inner flange member as an insert, or that the inner flange member is molded by an injection molding with the outer flange member as an insert, the outer flange member and the inner flange member are integrated at an interface between the outer flange member and the inner flange member.

Also, according to the fourth aspect of the invention, the casing member of the fuel tank connector disposed in the fuel tank as described in the first, second or third aspect, is a case for housing a float constituting a float valve. In this structure, the float valve can also be attached to a position where the connector is attached by attaching the connector to the fuel tank.

When it is required to change a size and a shape of the float valve according to a change in the fuel tank, the design of the float valve can be changed without changing the design of the connector due to the inner connecting portion.

DETAILED DESCRIPTION OF PREFERRED EMBODIMENTS

Hereunder, embodiments of the invention will be explained with reference to the accompanying drawings.

Figure 1:
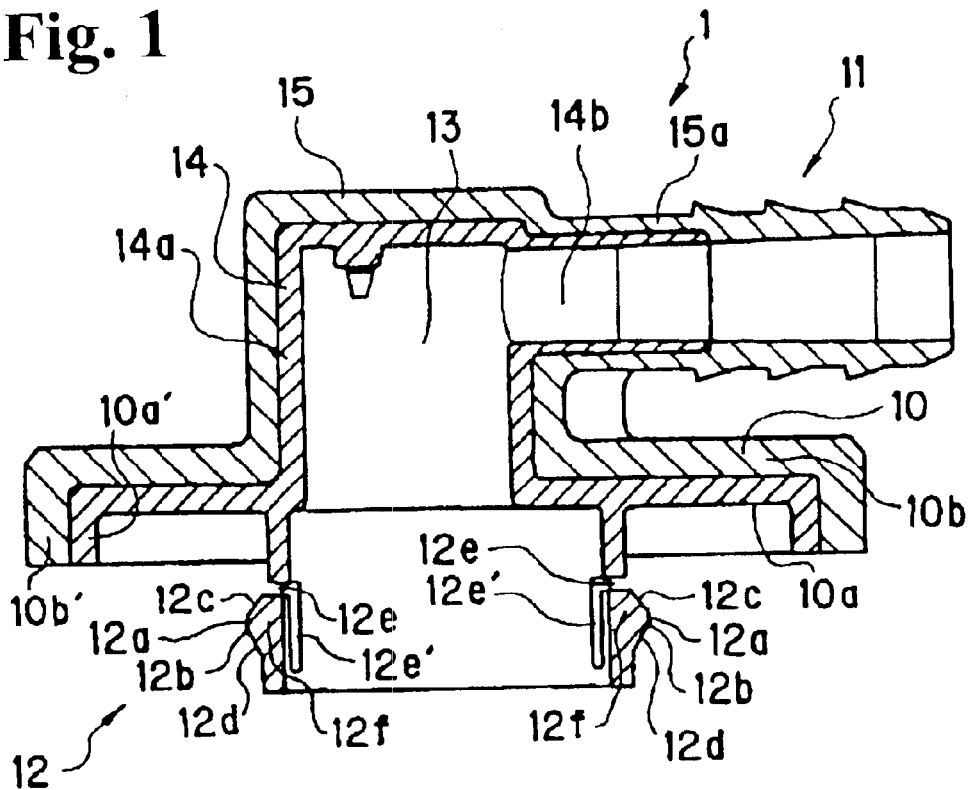
FIG. 1 is a sectional views showing a connector in a separated state.
Figure 1:
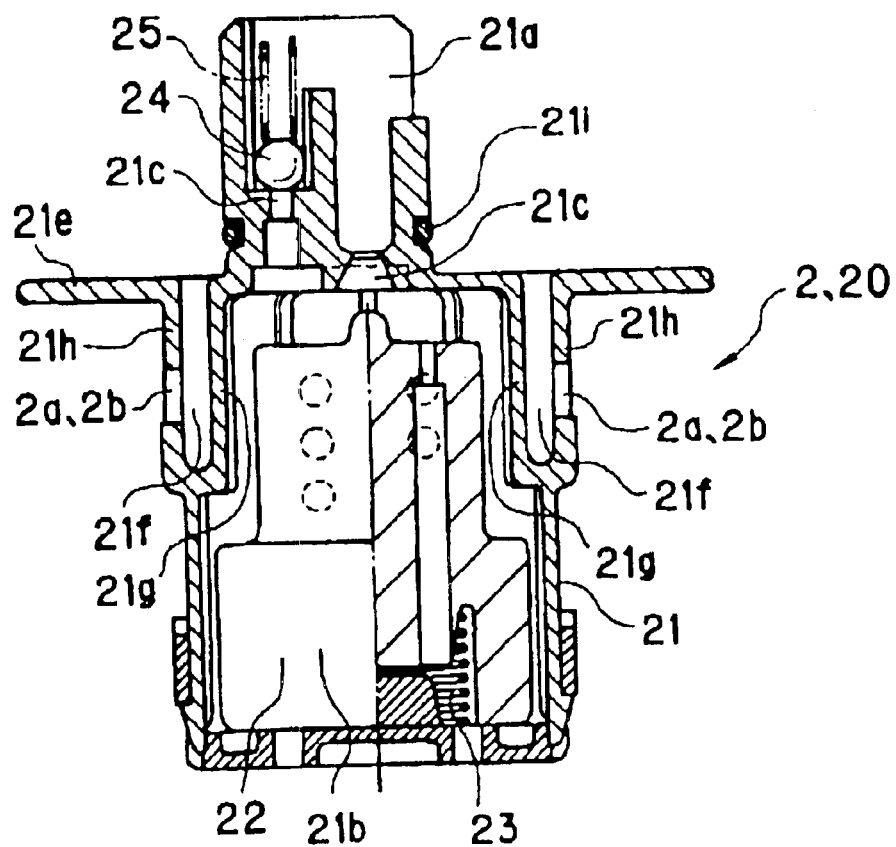
Figure 2:
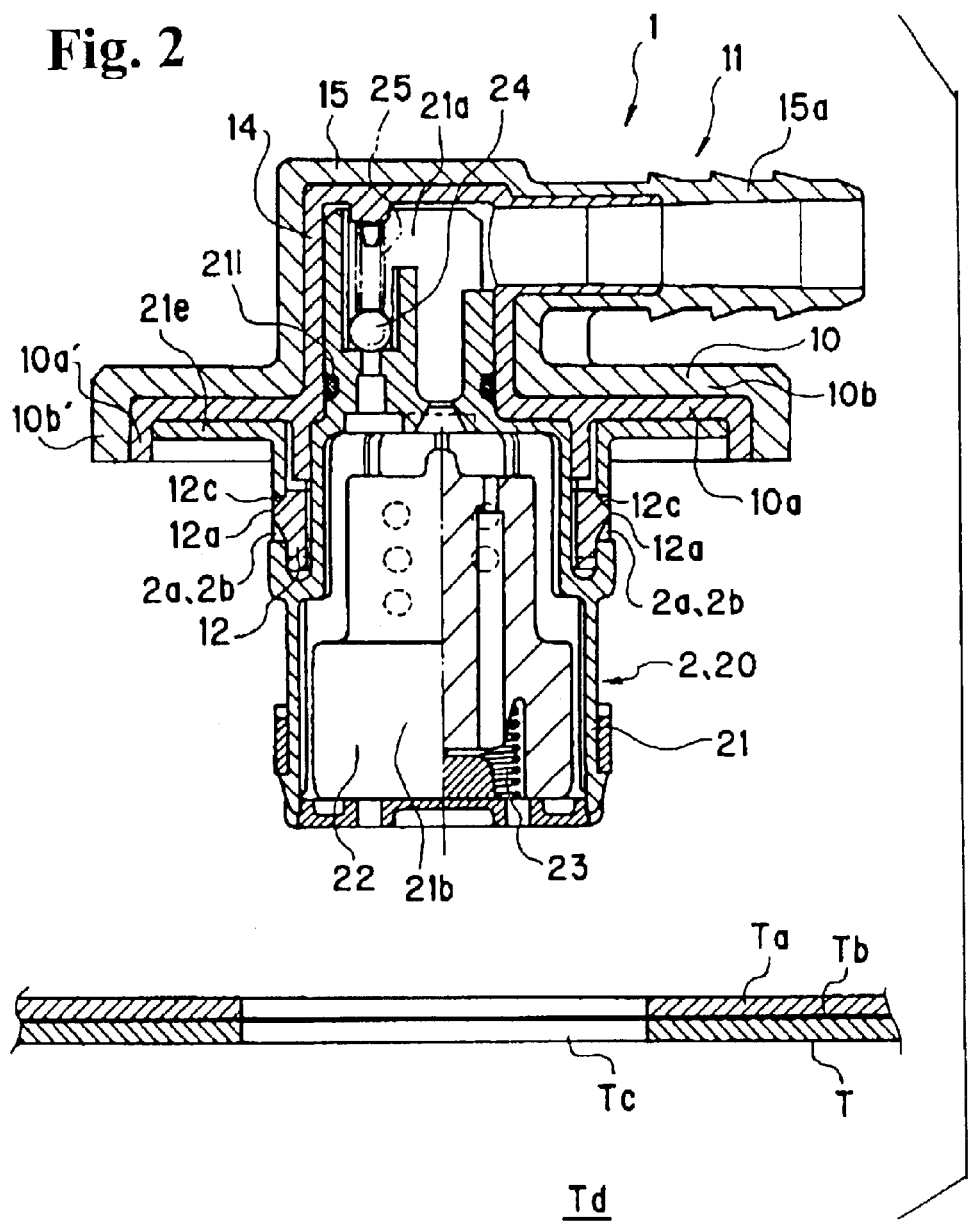
FIG. 2 is a sectional view of the connector.
Figure 3:
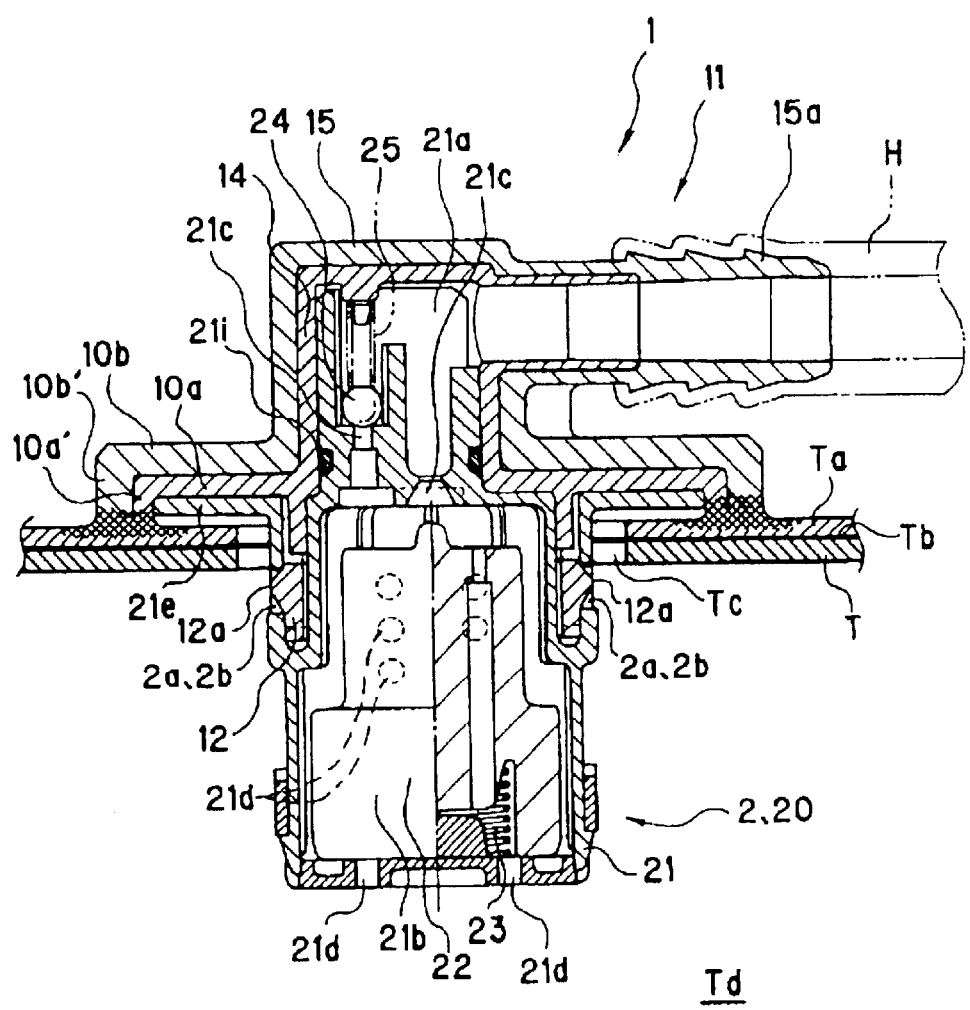
FIG. 3 is a sectional view showing the connector in an attached state.

FIG. 1 shows a connector 1 separated from a case 21 constituting a float valve 20. FIG. 2 shows a state that the connector 1 and the case 21 are assembled. FIG. 3 shows an attached state that the connector 1 assembled with the case 21 is welded to a fuel tank T.

The connector 1 of the present embodiment is used for connecting the fuel tank T having an outer surface Ta made of a synthetic resin and various kinds of pipe members H. The fuel tank T typically has an outer surface Ta and a gas barrier layer Tb provided inside the outer surface Ta. The outer surface Ta is typically made of polyethylene, especially, high-density polyethylene.

The pipe member H connected to the fuel tank T through the connector 1 includes a pipe member for supplying a fuel into the fuel tank T; a pipe member for sucking the fuel from the fuel tank T; a pipe member for sucking a gas from the fuel tank T; or the like.

The connector 1 includes a flange portion 10 for covering a connecting opening Tc provided in the fuel tank T from outside; an outer connecting portion 11 to be connected to the pipe member H; and an inner connecting portion 12 to be inserted into the fuel tank T through the connecting opening Tc of the fuel tank T.

The connecting opening Tc is provided in the fuel tank T as a through hole. The flange portion 10 has a size larger than the connecting opening Tc of the fuel tank T and enough to cover the connecting opening Tc from outside of the fuel tank T in a state that the inner connecting portion 12 is inserted into the fuel tank T through the connecting opening Tc from outside of the fuel tank T. In other words, the connector 1 is attached to the fuel tank T in a state that a surface of the flange portion 10 contacts the outer surface Ta of the fuel tank T around the connecting opening Tc of the fuel tank T. The inner connecting portion 12 is formed on one surface of the flange portion 10, and the outer connecting portion 11 is provided on the other surface of the flange portion 10. A flow path 13 extending between the inner connecting portion 12 and the outer connecting portion 11 is disposed inside the connector 1, thereby communicating the pipe member H and the fuel tank T with each other.

Also, the inner connecting portion 12 of the connector 1 is provided with an engaging portion 12a for engaging an engaging portion 2a provided in the casing member 2 to be disposed in the fuel tank T, when the casing member 2 to be disposed in the fuel tank T is fitted to an outside or an inside of the inner connecting portion 12.

The casing member 2 to be disposed in the fuel tank T may be a case 21 or the like constituting various valve devices. The case constituting a valve device has an opening at one end thereof. The inner connecting portion 12 is inserted into the case through the opening so that the case is fitted outside the inner connecting portion 12.

Also, the one end of the case 21 constituting the valve device is inserted into the inner connecting portion 12 so that the case 21 is fitted inside the inner connecting portion 12.

The engaging portion 12a is formed in, for example, a projection to engage an engaging portion (engaged portion) 2a having a window hole so that when the engaging portion 12a is fit, the engaging portion 12a is deformed elastically to engage an end of the casing member 2.

It is also possible to constitute such that the engaging portion 2a is formed in a projection to engage the engaging portion 12a having a window hole so that when the engaging portion 12a is fit, the engaging portion 2a is deformed elastically to engage end of the casing member 2.

Alternatively, it is also possible that both of the engaging portions 12a and 2a are deformed elastically through the fitting operation and, at the same time, both are engaged with each other at end of the casing member.

In other words, with the inner connecting portion 12 of the connector 1, it is possible to connect the casing member 2 to be disposed in the fuel tank T to the connector 1 with one motion. Thus, various functions can be provided to the connector 1. Also, even if the casing member 2 has the same function, when a shape and size of the casing member 2 have to be changed according to a change in a shape or size of the fuel tank T, it is possible to deal with the change just by changing the design of the casing member 2 without changing the design of the connector 1 due to the inner connecting portion 12. Of course, the connector 1 can be used without attaching the casing member 2 to the inner connecting portion 12.

In the embodiment shown in the drawing, the casing member 2 to be disposed in the fuel tank T is shown as the case 21 for receiving a float 22 constituting the float valve 20. In the embodiment, the float valve 20 can be attached to the fuel tank T by attaching the connector 1.

When the size and shape of the float valve 20 have to be changed according to a change in the size and shape of the fuel tank T, it is possible to deal with the change by changing the design of the float valve 20 without changing the design of the connector 1 due to the inner connecting portion 12.

In the connector 1, the flange portion 10 includes an inner flange member 10a integrated with the inner connecting portion 12 and an outer flange member 10b covering at least an outer peripheral portion of the inner flange member 10a. The outer flange member 10b is made of a synthetic resin same as that of the outer surface Ta of the fuel tank T, or contains a synthetic resin same as that of the outer surface Ta of the fuel tank T. At least an outer peripheral portion of the outer flange member 10b is heat-fused so as to be attached to the fuel tank T. The inner connecting portion 12 and the inner flange member 10a are made of a synthetic resin having a gas barrier property and a rigidity higher than that of the synthetic resin constituting the outer flange member 10b.

With this configuration, the inner connecting portion 12 of the connector 1 is inserted into the connecting opening Tc of the fuel tank T from outside in a state that the outer flange member 10b is heat-fused at the outer peripheral portion of the flange portion 10, so that the heat-fused portion can be welded well to the outer surface Ta of the fuel tank T around the connecting opening Tc.

Alternatively, after the inner connecting portion 12 of the connector 1 is inserted into the connecting opening Tc of the fuel tank T from outside, the outer peripheral portion of the outer flange member 10b of the flange portion 10 is heat-fused, so that the heat-fused portion can be welded well to the outer surface Ta of the fuel tank T around the connecting opening Tc.

Also, since the inner connecting portion 12 and the inner flange member 10a are made of a synthetic resin having a gas barrier property and a rigidity higher than that of the synthetic resin constituting the outer flange member 10b, a fuel gas (also called fuel vapor) generated from the fuel in the fuel tank T is effectively prevented from leaking by the inner flange member 10a.

The engaging portion 12a of the inner connecting portion 12 and the engaging portion 2a formed on the casing member 2 can be stably engaged.

Also, in the embodiment, the connector 1 is fixed to the fuel tank T by heat-fusing the outer peripheral portion of the inner flange member 10a and the outer peripheral portion of the outer flange member 10b with respect to the outer surface Ta of the fuel tank T. Thus, in the embodiment, the outer peripheral portion of the inner flange member 10a made of the synthetic resin having the gas barrier property is integrated with the outer surface Ta of the fuel tank T, so that the leakage of the fuel gas generated from the fuel in the fuel tank T can be more effectively prevented.

When the outer flange member 10b is formed of polyethylene, the outer peripheral portion of the flange portion 10 of the connector 1 can be welded well to the outer surface Ta of the fuel tank T made of polyethylene.

Further, the inner connecting portion 12 and the inner flange member 10a are made of the synthetic resin having a gas barrier property and a rigidity higher than that of the polyethylene constituting the outer flange member 10b. Thus, it is possible to achieve that the leakage of the fuel gas is prevented and the engagement between the casing member 2 and engaging portion 12a of the inner connecting portion 12 is stabilized while improving the welding ability of the connector 1 with respect to the fuel tank T.

Also, in case that the inner connecting portion 12 and the inner flange member 10a are formed of an alloy material or mixture of polyethylene and polyamide, the outer peripheral portion of the inner flange member 10a can be welded well with respect to the outer surface Ta of the fuel tank T made of polyethylene. At the same time, the leakage of the fuel gas can be prevented and the engagement between the casing member 2 and engaging portion 12a of the inner connecting portion 12 can be stabilized. Further, in case that the outer flange constituting the element 10b is injection-molded with the inner flange member 10a as an insert, or in case that the inner flange member 10a is injection-molded with the outer flange constituting element 10b as an insert, an interface between the outer flange member 10b and the inner flange member 10a can be integrated well.

Specifically, in the embodiment shown in the drawings, the connector 1 includes an inner or inside constituting portion 14 and an outer or outside constituting portion 15. The inner flange member 10a is formed in the inner constituting portion 14. More specifically, the inner constituting portion 14 includes a cylindrical portion 14a and the inner flange member 10a integrally provided around an outer periphery of the cylindrical portion 14a between upper and lower ends of the cylindrical portion 14a. In the embodiment, the inner flange member 10a is structured to have a circular outer edge when viewed plainly. A portion below the inner flange member 10a of the inner constituting portion 14 constitutes the inner connecting portion 12, and a portion above the inner flange member 10a of the inner constituting portion 14 constitutes the outer connecting portion 11.

The inner connecting portion 12 includes an opening at a lower end thereof. The engaging portions 12a are disposed at both sides of the inner connecting portion 12 facing each other. In the embodiment shown in the drawings, the engaging portion 12a is provided on an outer surface of an elastic piece 12f disposed at a side portion of the inner connecting portion 12 divided by a pair of vertical slots 12e' along a cylindrical axis of the inner connecting portion 12 and a horizontal slot 12e extending between upper ends of the pair of the vertical expanding slots 12e'.

In other words, a lower end of the elastic piece 12f is integrally connected to the lower end of the inner connecting portion 12, so that an upper end of the elastic piece 12f is elastically deformed toward inside the inner connecting portion 12.

The engaging portion 12a is constituted as a projection having an engaging surface 12c above a top portion 12b and a guiding surface 12d inclined toward the top portion 12b below the top portion 12b.

In the embodiment shown in the drawings, the fuel connector is structured such that when the inner connecting portion 12 is inserted into the case 21 of the float valve 20 (described later) by fitting the case 21 outside the inner connecting portion 12, the elastic pieces 12f bent inward as the engaging portions 12a slide the inner surface of the case 21. Then, the engaging portions 12a enter the engaging portions 2a and return to the original shape to engage with each other when the engaging portions 12a reach the engaging portions 2a formed on the side portions of the case 21 and having window holes.

Also, in the embodiment shown in the drawings, the upper end of the inner constituting portion 14 is closed, and a pipe portion 14b projecting laterally is provided at a side of the upper portion of the inner constituting portion 14. The pipe portion 14b has an opening at the projecting end, and is communicated with an interior of the inner constituting portion 14 at the base portion.

Also, in the embodiment shown in the drawings, a periphery projection 10a' projecting downward is provided at the outer peripheral portion of the inner flange member 10a. The periphery projection 10a' is welded to the outer surface Ta of the fuel tank T together with a periphery projection 10b' of the outer flange member 10b.

The outer constituting portion 15 is structured to cover the whole outer surface above the inner flange member 10a of the inner constituting member 14. The outer flange member 10b covers the upper surface of the inner flange member 10a and the outer surface of the periphery projection 10a' of the inner flange member (i.e. a vertical surface on the side opposite to the inner connecting portion 12). In other words, in the embodiment, the outer flange member 10b also includes the periphery projection 10b' projecting downward at the outer peripheral portion.

In the embodiment shown in the drawings, the periphery projection 10b' of the outer flange member 10b and the periphery projection 10a' of the inner flange member 10a are heat-fused together, thereby welding the outer peripheral portion of the flange portion 10 of the connector 1 to the outer surface Ta of the fuel tank T (shown in FIG. 3).

Also, in the embodiment shown in the drawings, the outer constituting portion 15 includes a pipe portion 15a extending sideways with the pipe portion 14b of the inner constituting portion 14 therein and having a length longer than the pipe portion 14b of the inner constituting portion 14, so that the pipe member H can be fitted to the outside of the pipe portion 15a of the outer constituting portion 15.

Also, in the embodiment shown in the drawings, the case 21 for housing the float 22 constituting the float valve 20 includes an upper chamber 21a and a lower chamber 21b where the float 22 is housed. In the embodiment shown in the drawings, the upper chamber 21a and the lower chamber 21b are communicated with each other through two communicating holes 21c. The lower chamber 21b side, i.e. the inner portion of the fuel tank T, and the upper chamber 21a side, i.e. the pipe member H side, are communicated with each other through the two communicating holes 21c.

In the embodiment shown in the drawings, one of the two communicating holes 21c is closed at the upper chamber 21a side by a ball 24 received in the upper chamber 21a. The ball 24 is normally urged to close the one of the communicating holes 21c by a coil spring 25 disposed between an upper portion of the inner constituting portion 14 and the ball 24. In case that an inner pressure of the fuel tank T is raised higher than a predetermined value, the ball 24 is moved upward against the urging force of the spring 25 to thereby open the one of the communicating holes 21c.

The other of the two communicating holes 21c is closed at the lower chamber 21b side when the float 22 received in the lower chamber 21b moves upward.

In the embodiment shown in the drawings, the float 22 is normally lowered in a state under a predetermined upward urging force of a coil spring 23 disposed between a lower portion of the float 22 and a bottom portion of the lower chamber 21b of the case 21. The fuel gas in the fuel tank T is sent to a canister or the like from the pipe member H through the other of the communicating holes 21c when the float 22 is in the lowered state. Fuel inlet holes 21d are formed on the side and bottom portions of the lower chamber 21b of the case 21. The float 22 is elevated by the fuel entering into the lower chamber 21b through the inlet holes 21d, so that the other of the two communicating holes 21c is closed by a valve member provided on an upper portion of the float 22. In case that the fuel tank T, i.e. a car provided with the fuel tank T, is inclined, the float 22 is also elevated to thereby close the other of the two communicating holes 21c by the urging force of the spring 23.

In the embodiment shown in the drawings, the case 21 includes also a flange 21e surrounding an outer periphery thereof, and the upper chamber 21a is a portion above the flange 21e and the lower chamber 21b is a portion below the flange 21e.

In the case 21, an upper edge portion of the upper chamber 21a abuts against an upper inner surface of the inner constituting portion 14, and an upper surface of the flange 21e is pressed against a lower surface of the inner flange member 10a of the inner constituting portion 14.

Accordingly, the case 21 with the upper chamber 21a is inserted upward from the open lower end of the inner connecting portion 12. Also, in the embodiment, the case 21 is inserted into the connector 1 in a state that a rubber sealing ring 21i is attached at a position above the flange 21e of the case 21. Thus, the rubber sealing ring 21i prevents the leakage of the fuel gas through between the outer surface of the case 21 and the inner surface of the connector 1.

In the embodiment shown in the drawings, the case 21 includes a receiving depression 21f for receiving the inner connecting portion 12 from the upper side at approximately the middle thereof in the vertical direction. More specifically, a lower end of an outer plate casing member 21h is integrally connected to a side plate casing member 21g to provide a space between the outer plate casing member 21h and the side plate casing member 21g constituting the lower chamber 21b for receiving the float 22, thereby forming the receiving depression 21f. In the embodiment, a window hole 2b as the engaging portion 2a is formed in the outer plate casing member 21h.

According to the fuel tank connector of the present invention, the outer flange member is made of the resin same as that of the outer surface of the fuel tank. Therefore, the outer peripheral portion of the outer flange member can be welded well to the fuel tank having the outer surface made of the synthetic resin.

Also, the inner flange member and the inner connecting portion of the member disposed in the fuel tank are made of a synthetic resin having gas barrier property and rigidity higher than that of the synthetic resin constituting the outer flange member. Therefore, the leakage of the fuel gas can be effectively prevented. Further, the engagement with the member to be disposed inside the fuel tank through the connector can be stable.

While the invention has been explained with reference to the specific embodiments of the invention, the explanation is illustrative and the invention is limited only by the appended claims.

What is claimed is:

1. A connector for connecting a fuel tank with a connecting opening, and a pipe member, comprising:

a flange portion for covering the connecting opening of the fuel tank from an outside thereof, said flange portion including an inner flange member having an outer peripheral portion and formed of a first synthetic resin with a gas barrier property, and an outer flange member covering at least the outer peripheral portion and formed of a second synthetic resin containing at least a synthetic resin for an outer surface of the fuel tank so that the second synthetic resin can be fixed to the fuel tank by fusing, said first synthetic resin having a rigidity greater than that of the second synthetic resin, an outer connecting portion extending outwardly from the flange portion to be connected to the pipe member, said outer connecting portion being integrally formed with the outer flange member, an inner connecting portion to be inserted into the fuel tank through the connecting opening of the fuel tank, said inner connecting portion being formed of the first synthetic resin and integrally formed with the inner flange member, a device attached to the inner connecting portion to be disposed inside the fuel tank, and having a casing, a first engaging portion formed on the casing and an upper flange extending laterally outwardly from the casing so that when the device is attached to the inner connecting portion and assembled with the fuel tank, the upper flange is located under the inner flange member outside the fuel tank to cover a lower surface of the inner flange member, and a second engaging portion disposed on the inner connecting portion to engage the first engaging portion.

2. A connector according to claim 1, wherein said outer flange member includes an outer peripheral portion covering the outer peripheral portion of the inner flange member, said outer peripheral portions of the inner and outer flange members being adapted to contact the outer surface of the fuel tank and being heat-fused thereto.

3. A connector according to claim 1, wherein said first synthetic resin is a mixture of polyethylene and polyamide, and the second synthetic resin is polyethylene.

4. A connector according to claim 1, wherein said casing houses a member to be disposed in the fuel tank.

5. A connector according to claim 4, wherein said member is a float for constituting a float valve.

6. A connector according to claim 1, wherein said casing includes a side plate casing member, an outer plate casing member located outside the side plate casing member, and a depressed portion formed between the side plate casing member and the outer plate casing member and extending from an upper end thereof for receiving the inner connecting portion therein.

7. A connector according to claim 6, wherein said upper flange extends laterally outwardly from the outer plate casing member.

8. A connector according to claim 1, wherein said outer connecting portion includes an outer vertical portion extending upwardly from the outer flange member, an inner vertical portion situated inside the outer vertical portion and extending from the inner flange member, an inner lateral portion extending laterally from the inner vertical portion, and an outer lateral portion extending laterally from the outer vertical portion over the inner lateral portion.

9. A connector according to claim 6, wherein said side plate casing member and said outer plate casing member are joined at a middle of the casing, and a single side wall extends downwardly to form the casing.

10. A connector according to claim 9, wherein said second engaging portion is formed in the outer plate casing member.

* * * * *